United States Patent
Peiffer et al.

(10) Patent No.: US 11,041,056 B2
(45) Date of Patent: *Jun. 22, 2021

(54) TRANSPARENT, THERMOFORMABLE, BIAXIALLY ORIENTED POLYESTER FILM, PROCESS FOR PRODUCTION THEREOF AND USE THEREOF

(71) Applicant: Mitsubishi Polyester Film GmbH, Wiesbaden (DE)

(72) Inventors: Herbert Peiffer, Mainz (DE); Martin Jesberger, Mainz (DE); Stefan Bartsch, Bodenheim (DE); Bodo Kuhmann, Runkel (DE); Viktor Fischer, Oftersheim (DE); Matthias Konrad, Kriftel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,829

(22) Filed: Jun. 19, 2019

(65) Prior Publication Data

US 2019/0390002 A1 Dec. 26, 2019

(30) Foreign Application Priority Data

Jun. 20, 2018 (DE) .................. 10 2018 210 044.6
Dec. 7, 2018 (DE) .................. 10 2018 221 226.0

(51) Int. Cl.

| | | |
|---|---|---|
| *C08G 63/183* | (2006.01) | |
| *C08J 5/18* | (2006.01) | |
| *B29C 48/08* | (2019.01) | |
| *B29C 48/00* | (2019.01) | |
| *C08J 7/043* | (2020.01) | |
| *C08J 7/046* | (2020.01) | |
| *C08J 7/048* | (2020.01) | |
| *C08K 5/13* | (2006.01) | |

(52) U.S. Cl.
CPC ............ *C08J 5/18* (2013.01); *B29C 48/0018* (2019.02); *B29C 48/08* (2019.02); *C08G 63/183* (2013.01); *C08J 7/043* (2020.01); *C08J 7/046* (2020.01); *C08J 7/048* (2020.01); *C08K 5/13* (2013.01); *C08K 2201/019* (2013.01)

(58) Field of Classification Search
USPC .................................. 528/271, 272
See application file for complete search history.

(56) References Cited

U.S. PATENT DOCUMENTS

| | | |
|---|---|---|
| 4,571,363 A | 2/1986 | Culbertson et al. |
| 5,217,563 A | 6/1993 | Niebling et al. |
| 5,897,959 A | 4/1999 | Kim et al. |
| 2019/0344530 A1* | 11/2019 | Klein ............... C08J 7/0427 |
| 2019/0389187 A1* | 12/2019 | Peiffer .............. B65D 81/343 |

FOREIGN PATENT DOCUMENTS

| | | |
|---|---|---|
| DE | 102 47 894 A1 | 4/2004 |
| DE | 10 2011 087 740 A1 | 6/2013 |
| EP | 0 144 948 A | 6/1985 |
| EP | 0 415 383 A2 | 3/1991 |
| EP | 1 697 129 B1 | 9/2006 |
| EP | 2 810 776 A1 | 12/2014 |
| EP | 1 945 512 B1 | 6/2016 |

OTHER PUBLICATIONS http://www.bfr.bund.de/cm/343/barrierewirkung-ausgewaehlter-kunststoffmaterialien-gegen-die-migration-von-mineraloelfraktionen-in-lebensmittel.pdf (Barrier effect of selected plastic materials against the migration of mineral oil fractions in foods).
EPO Search Report in the corresponding European Patent Application No. 19 17 9987.

* cited by examiner

*Primary Examiner* — Terressa Boykin
(74) *Attorney, Agent, or Firm* — ProPat, LLC; Cathy R. Moore

(57) ABSTRACT

The present invention relates to a transparent, biaxially oriented, thermoformable polyester film including at least 85% by weight of a copolyester whose dicarboxylic acid components derive to an extent of 85 to 94 mol % from terephthalic acid-based units and to an extent of 6 to 15 mol % from isophthalic acid-based units. The inventive films exhibit a surface elasticity modulus in the range from 4500 to 6400 N/mm²; a sum total of the strengths ($\sigma_S$) in longitudinal direction and in transverse direction in the range from 170 to 220 MPa; a density of less than 1390 kg/m³; a haze of less than 2.0%; a clarity of at least 85%; a gloss of at least 120 and a thickness in the range from 50 to 300 μm. The invention further relates to processes for producing such films, and to the use thereof.

15 Claims, 1 Drawing Sheet

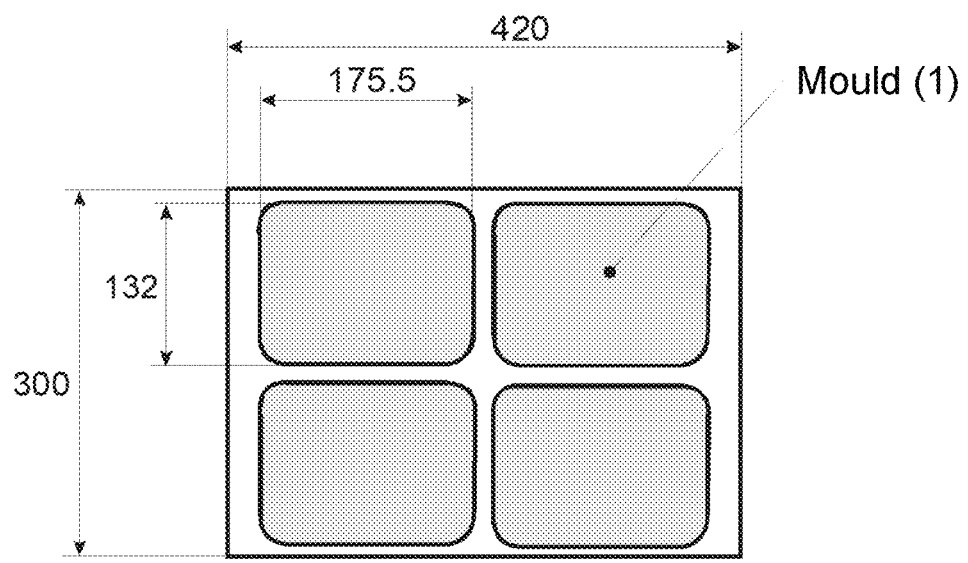

TRANSPARENT, THERMOFORMABLE, BIAXIALLY ORIENTED POLYESTER FILM, PROCESS FOR PRODUCTION THEREOF AND USE THEREOF

CROSS-REFERENCE TO RELATED APPLICATIONS

This application claims priority to German Patent Application 10 2018 210 044.6 filed Jun. 20, 2018, and German Patent Application 10 2018 221 226.0 filed Dec. 7, 2018, both of which are hereby incorporated herein by reference in their entirety.

FIELD OF THE INVENTION

The invention relates to a high-transparency, thermoformable and biaxially oriented polyester film having a base layer and, optionally, outer layers applied to this base layer. The thermoformable, biaxially oriented polyester film comprises polyesters based on aromatic acids and aliphatic diols. The film is notable for good thermoformability, good optical properties, enhanced mechanical stability, and good scratch resistance. The invention further relates to a process for producing the film and to the use of the film.

BACKGROUND OF THE INVENTION

Thermoformable or heat-formable films are well known and are found in a multiplicity of different applications. The films as a whole are notable for ready shapability (drawing) under hot conditions, in the case of vacuum forming or compressed-air forming or of mechanical action using dies. Typical film materials for thermoforming are PVC, PET, PS, PP, and especially PC. Also often employed are multi-layer film systems (PS/EVOH/PE or PP/EVOH/PE), having, for example, better heat-sealing properties or vapour barriers for improved keeping properties in the case of foods. Typical fields of application for thermoformed films are in-mould decoration/in-mould labelling (IMD/IML), packaging of food, e.g. meat or poultry, blisters, hard-shell cases, furniture or metal lamination (can liners). The technical processes involved in shaping the film are similar among the stated applications, and therefore two typical applications will be briefly described at this point.

In the case of in-mould decoration/in-mould labelling (e.g. Foliotec), the film is first brought to the respective forming temperature, which must be significantly greater than the glass transition temperature of the polymer that is to be shaped. This is done, for example, by means of radiant IR emitters or of contact heating. The underside of the preheated film/preheated intermediate is evacuated (standard: around 50 mbar). As a result of the pressure difference that is developed, the film/the intermediate is drawn from the atmospheric pressure of the top side into the hollow mould (negative shaping) on the vacuum side. The shaped film is subsequently cooled and brought to ambient temperature. Defects on the product, such as quenching tracks from the cooling operation, for example, are prevented by appropriate thermal conditioning of the mold. In order to protect the decoration it is usual to operate without an upper die.

One variant is the High-Pressure Forming (HPF) process, which was developed and patented by the companies Bayer and Niebling (e.g. U.S. Pat. No. 5,217,563A). It is employed primarily when surface decorations with symbols are used which are to lie in-register on the subsequent injection moulding. Typical products produced by this process are radio panels for cars. With these panels, it is important to ensure that the symbol display for the individual function keys is located in-register at the correct position. The same also applies for tachograph panels.

With this process, around 300 bar of air bring the film into the mould without contact. When this technology is employed, moreover, the film can be shaped at below the softening temperature of the polymer used. This has advantages—the symbol is retained in-register and the deformation occurs without marks on the film. Furthermore, because of the low thermal load on the polymer, the gloss of the films is unchanged. The cycle times are relatively short, resulting in turn in low production costs.

Typical examples from packaging applications are transparent food trays, which are produced, for example, from a-PET, modified boPET or from PA/PET laminates, with application of vacuum or compressed air. After filling with food, the food tray is thermally sealed with a film which is heat-sealed onto the rim of the food tray. Packs of this kind are used in particular with meat, fish, poultry and dry ready-made products such as sandwiches, burgers or wraps. The provision of the products in such packs is regarded as clean and hygienic and it therefore enjoys great popularity.

One particularly economical method of producing clean and hygienic packs for the processing of fresh meat, fish or poultry is to employ vacuum processes using Multivac machines.

The market imposes high optical requirements on the films for thermoforming, and particularly on the haze, the clarity and the gloss of the films. So that the pack contents or the injection moulding (e.g. radio component) lying behind the thermoformed film (e.g. panel) are readily recognizable, the haze of the film (before and after thermoforming) ought to be <2% and the clarity of the pack ought to be >85%. Moreover, the film is to be visually appealing to the viewer. For this purpose, high film gloss values are a target.

The thermoformed product is additionally required to exhibit high puncture resistance and good scratch resistance, so that it can withstand transportation without damage and so that the functionality of the product is maintained during the life cycle.

Films for thermoforming application are known.

EP 2810776 A1 describes antimony-free, thermoformable and temperature-stable, biaxially oriented polyester films for metal lamination, and also for the packaging of foods, enabling them, for example, to be cooked in an oven without any need for the food to be removed from the packaging beforehand (cook-in). According to EP 2810776, suitability for this purpose is possessed by polyester films which are produced from antimony-free polyesters and which comprise radical scavengers. The biaxially oriented polyester films have at least one layer which consists to an extent of less than 95 mol % of a homopolymer, and within this layer they include at 300 ppm of radical scavenger, the films being used for producing a lid, film pouch or film hose, or as a metal-laminating film.

The films thus produced are suitable for producing thermoformable film pouches with a low thermoforming ratio. The films described are capable of being improved in terms of thermoformability and puncture resistance, but in particular are capable of improvement in their optical properties, such as haze and clarity.

EP 1 697 129 B1 describes a thermoformable film laminate which comprises a thermoformable film layer (a), a structural film layer (b), a heat-suitable layer (c) and optionally a barrier layer (d). Adjoining the first surface of the thermoformable film layer (a) is the structural film layer (b), and the heat-sealable layer (c) is located at the opposite, second surface, which faces the inside of the pack. The thermoformable film layer (a) has a polymer composition which comprises at least 80% by weight of polyethylene terephthalate. The laminate is suitable for the application stated at the outset, but is capable of improvement in terms of thermoformability and puncture resistance, and in particular is capable of improvement in its optical properties, such as haze and clarity.

EP 1 945 512 B1 describes a method for packing fish or meat that comprises the following steps: (i) providing a thermoformable polymeric receiving film (bottom foil) and a polymeric covering film (upper foil). The receiving film consists of a single-layer polyester or polyamide substrate, and the covering film is preferably constructed of polyester polymers. At least one of the two surfaces of the receiving film and of the covering film has a heat-suitable surface. (ii) Providing a heightened outer part and a lowered middle part in the receiving film by means of thermoforming. (iii) Disposing a portion of meat or fish on the inner (first) surface of the receiving film. (iv) Arranging the covering film over the portion of meat or fish, so that the inner (first) surface of the covering film is facing the inner surface of the receiving film. (v) Contacting the rim sections of the first surface of the receiving film and the first surface of the covering film, and forming a heat-sealed connection between them, and (vi) optionally freezing the packaged meat or fish. The process is suitable for the application identified at the outset; however, the films described in more detail in EP 1 945 512 B1 are capable of being improved in terms of their thermoformability and puncture resistance, but in particular are capable of improvement in optical qualities (haze and clarity).

Another example of this is formed by EP 0 415 383, which describes the use of a polyester film having a melting point of 210 to 245° C., a planar orientation of 0.10 to 0.16, a shrinkage of less than/equal to 10% and a density of less than 1.385 g/cm$^3$. The film is notable for good deformability and effective adhesion to metal, and is intended for use, for example, in can lamination. The process is suitable for the application specified at the outset; however, the films described in more detail in EP 0 415 383 are capable of being improved in terms of their optical qualities (haze, gloss and clarity).

SUMMARY OF ADVANTAGEOUS
EMBODIMENTS OF THE INVENTION

It was an object of the present invention to provide, for the applications stated at the outset, a film which is notable in particular for good thermoformability. Moreover, the film is to display particularly brilliant optical qualities—in particular a high clarity—and is to be puncture-resistant and to have enhanced scratch resistance relative to thermoformable PC films. It is no longer to have the disadvantages of prior-art films, and is to be distinguished in particular by the following points/properties:

The thermoformability of the film is to be such that it can be used to package typical market products (meat, poultry or fish portions) in trouble-free manner in the desired packaging design. In accordance with the requirements of the market, the film is to be thermoformable at least to a depth of 70 mm.

In addition, the film is to have very good mechanical properties. The mechanical property of the film that is particularly important for the present applications is its puncture resistance. The puncture resistance is to be high enough to allow the finished product to be transported and stored without suffering damage.

The film is to be notable for brilliant optical qualities. This relates to the haze and the gloss, but especially to the clarity, of the film of the invention. The film is desired to have a haze of less than 2%, a clarity of greater than 85% and a gloss of greater than 120 (all optical values are measured directly after production of the film).

In addition, the film is to have good barrier properties, particularly with respect to oxygen, water vapour and different flavours.

In addition, the pack is to have good barrier properties, particularly with respect to oxygen and water vapor. The yardstick for comparison are the permeation values of customary biaxially oriented PET films produced in accordance with the prior art (see, for example, http://www.bfr.bund.de/cm/343/barrierewirkung-ausge-waehlter-kunststoffmaterialien-gegen-die-migration-von-mineraloelfraktionen-in-lebensmittel.pdf), which must not be exceeded or may be exceeded only marginally (<5%). The permeation values of PET films 100 μm thick are as follows: OTR=15 cm$^3$/(m$^2$ d bar) and WVTR=2 g/(m$^2$ d).

The high-transparency film which, accordingly, has a low degree of filling (concentration of antiblocking agent; see later below) is to have good winding and processing qualities. During winding and unwinding of the film, individual plies of film may not adhere to one another, not even at elevated temperature, e.g. 50 or 60° C. Increased adhesion between individual plies of film would hinder the unwinding of the film or even make it impossible to unwind.

The film is to be able to be produced economically. This means, for example, that the film can be produced by processes which are customary in the industry.

BRIEF DESCRIPTION OF THE DRAWINGS

FIG. 1 is a schematic drawing of the format set for exemplary trays produced in accordance with Inventive Example 3.

DETAILED DESCRIPTION OF
ADVANTAGEOUS EMBODIMENTS OF THE
INVENTION

The object is achieved through the provision of a transparent, biaxially oriented, thermoformable polyester film comprising at least 85% by weight of a copolyester whose dicarboxylic acid components derive to an extent of 85 to 94 mol % from terephthalic acid-based units and to an extent of 6 to 15 mol % from isophthalic acid-based units, where the film comprises
  a) a surface elasticity modulus in the range from 4500 to 6400 N/mm$^2$,
  b) a sum total of the strengths ($\sigma_5$) in longitudinal direction and in transverse direction in the range from 170 to 220 MPa,
  c) a density of less than 1390 kg/m$^3$,
  d) a haze of less than 2.0%, a clarity of at least 85% and a gloss of at least 120, and
  e) a thickness in the range from 50 to 300 μm.

Above and below, % by weight, unless otherwise mentioned, refers always to the mass of the respective layer or respective system in connection with which the data is stated.

The film according to the present invention comprises a thermoformable, transparent, biaxially oriented, one-layer polyester film (A), or a transparent, biaxially oriented, multilayer coextruded polyester film, e.g. (A' A" A''').

The biaxially oriented polyester film comprises a thermoplastic copolyester to an extent of at least 85% by weight. In accordance with the invention this is a copolyester whose dicarboxylic acid components derive to an extent of 85 to 94 mol % from terephthalic acid-based units and to an extent of 6 to 15 mol % from isophthalic acid-based units. It is preferably a copolyester whose dicarboxylic acid components derive to an extent of 86 to 93 mol % from terephthalic acid-based units and to an extent of 7 to 14 mol % from isophthalic acid-based units. In accordance with the invention, a diol of preferred suitability in the thermoplastic copolyester is ethylene glycol.

From 0 to 15% by weight of the film may be constructed from further polymers/polymer fractions and/or from further substances, in which case the further polymers/polymer fractions originate from other aromatic and/or aliphatic dicarboxylic acids and diols, respectively. For the thermoplastic polyester of the film of the invention, it is also possible, advantageously, to use mixtures or blends of the stated homopolymers and/or copolymers.

Suitable other aromatic dicarboxylic acids are preferably terephthalic acid, 2,5-furandicarboxylic acid (FDCA), biphenyl-4,4'-dicarboxylic acid, naphthalenedicarboxylic acids (for example naphthalene-1,4- or -1,6-dicarboxylic acid or naphthalene-2,6-dicarboxylic acids), biphenyl-x,x'-dicarboxylic acids (especially biphenyl-4,4'-dicarboxylic acid), diphenylacetylene-x,x'-dicarboxylic acids (especially diphenyl-acetylene-4,4'-dicarboxylic acid) or stilbene-x,x'-dicarboxylic acids. The cycloaliphatic dicarboxylic acids include cyclohexanedicarboxylic acids (especially cyclohexane-1,4-dicarboxylic acid). Particularly suitable among the aliphatic dicarboxylic acids are the ($C_3$-$C_{19}$) alkanedioic acids, in which the alkane moiety may be straight-chain or branched.

Suitable other aliphatic diols are, for example, ethylene glycol, diethylene glycol, triethylene glycol, aliphatic glycols of the general formula HO—(CH2)n-OH, where n is an integer from 3 to 6 (especially propane-1,3-diol, butane-1,4-diol, pentane-1,5-diol and hexane-1,6-diol), or branched aliphatic glycols having up to 6 carbon atoms, and cycloaliphatic, optionally heteroatom-containing, diols having one or more rings. The cycloaliphatic diols include cyclohexanediols (especially cyclohexane-1,4-diol). Suitable other aromatic diols correspond, for example, to the formula HO—$C_6H_4$—X— $C_6H_4$—OH, where X is —$CH_2$—, —$C(CH_3)_2$—, —$C(CF_3)_2$—, —O—, —S— or —$SO_2$—.

Through the choice of the fractions according to the invention in the copolyester that derive from units based on terephthalic acid and isophthalic acid, the desired good mechanical properties of the biaxially oriented polyester film are obtained, but in particular the desired good thermoformability. If the fraction of the dicarboxylic acid components deriving from isophthalic acid-based units is less than 6 mol %, the desired good thermoformability of the film may not be obtained. I, on the other hand, this fraction is more than 15 mol %, then reliable production of the film of the invention by the process described below is no longer assured. Films which consist of such high fractions of components deriving from isophthalic acid-based units have a very strong tendency in the production procedure, for example, to stick to themselves or to the corresponding machine parts, examples being rolls in the longitudinal stretching or rolls in the exit section from the machine after the transverse stretching.

The polyesters may be prepared by the transesterification process. This process starts from dicarboxylic esters and diols, which are reacted using the usual transesterification catalysts, such as salts and zinc, of calcium, of lithium and of manganese. The intermediates are subjected to polycondensation in the presence of well-known polycondensation catalysts, such as antimony trioxide, titanium oxide, and also germanium compounds. The preparation may equally well take place by the direct esterification process in the presence of polycondensation catalysts. In that case the starting materials, directly, are the dicarboxylic acids and the diols.

It has proven to be particularly advantageous if the intermediates are subjected to polycondensation in the presence of titanium dioxide or germanium compounds, or if the direct esterification processes are carried out in the presence of polycondensation catalysts such as titanium dioxide or germanium compounds. The biaxially oriented polyester film is then antimony-free. "Antimony-free" refers in the sense of the invention to an antimony content of s 20 ppm (an antimony content of s 20 ppm can be accepted in the polyester raw material, since antimony-free raw materials to are usually synthesized in reactors in which antimony-containing/antimony trioxide-catalysed raw materials are produced. It is therefore not always possible to rule out ubitiquous antimony traces entirely). The aim in the particularly preferred case is for a biaxially oriented polyester film which contains no antimony and can therefore be used in packaging applications where the film is in direct food contact.

The film according to the present invention is characterized by a surface elasticity modulus in the range from 4500 to 6400 N/mm², in accordance with the formula below:

$$E_{surface} = \sqrt{(E_{MD}^2 + E_{TD}^2)}.$$

$E_{MD}$ is the elasticity modulus of the film as measured in the longitudinal direction of the machine, and $E_{TD}$ is the elasticity modulus of the film as measured in the transverse direction of the machine. This property is to achieved essentially by compliance with the production procedure of the invention, described below, in conjunction with the polyesters of the invention, described above. It has surprisingly been found that if the surface modulus is less than 4500 N/mm², the film no longer has the desired mechanical properties and is therefore unsuitable for the stated application. Upon account of the inadequate surface elasticity modulus, for example, the film can no longer be reasonably wound; creases form, which are unwanted. Moreover, in the context of the present invention it has been found that on the other hand, if the surface modulus is greater than 6400 N/mm², the film can no longer be thermoformed in accordance with the stated objective.

Furthermore, the film according to the present invention is characterized by the sum total of the strengths ($σ_s$) in the longitudinal direction (MD) and in the transverse direction (TD) in the range from 170 to 220 MPa. This property is essentially achieved, again, by compliance with the production procedure of the invention, described below, in conjunction with the polyesters of the invention, described above. If the sum total of the strengths is less than 170 MPa, then the film no longer has the desired mechanical properties and is therefore unsuitable for the application. Because of the inadequate sum total of the strengths, for example, the film can no longer be reasonably transported in the thermoforming machine; the film warps, which is unwanted. On the other hand, if the sum total of the strengths is greater than 220 MPa, the film can no longer be thermoformed in accordance with the stated objective.

Furthermore, the film according to the present invention was characterized by a density of less than 1390 kg/m$^3$. This property is essentially achieved, again, by compliance with the production procedure of the invention, described below, in conjunction with the polyesters of the invention, described above. If the density of the film is greater than 1390 kg/m$^3$, then the film, surprisingly, is too crystalline to be able to be thermoformed in accordance with the stated objective.

To achieve the desired good mechanical properties, but especially to achieve the desired good thermoformability, of the film, it is necessary for the SV of the film to be situated within a defined range. In accordance with the invention, the SV of the film is in the range from 680 to 1000, preferably in the range from 710 to 950, especially preferably in the range from 740 to 900. This is subject to the proviso that the SV values of the respective polymer melts (base layers and outer layers) ought to differ by not more than 100, preferably not more than 75, but especially not more than 50 units.

If the SV of the film is less than 680, it is not possible to achieve the requisite good thermoformability of the film, with thermoforming depth of around 70 mm. If, on the other hand, the SV is greater than 1000, then the polyester is too viscous and can for example no longer be economically extruded.

In order to improve further the processing behaviour of the film, it is of advantage to incorporate particles of the film. In that event it has proven to be favorable to comply with, and also to improve, the following conditions: the particles are to have a mean particle diameter $d_{50}$ of 1.5 to 5.0 μm. It has proven to be particularly useful to use particles having a $d_{50}$ of 1.7 to 4.5 μm and more preferably of 2.0 to 4.0 μm.

The particles are to be present in the film at a concentration of 0 to 0.1% by weight (1000 ppm). The concentration of the particles in the film is preferably $1.0 \times 10^{-5}$ to 0.075% by weight and more preferably $1.1 \times 10^{-5}$ to 0.05% by weight.

Where particles are used which have a diameter $d_{50}$ which is below 1.5 μm, there is no positive influence by the particles on, for example, the winding of the film. In this case, the film tends to suffer tearing or continued tearing during unwinding, for example, which is unwanted. Particles having a diameter $d_{50}$ of greater than 5.0 μm generally cause problems when the film is stretched, with increasing formation of vacuoles, which negatively influence the haze of the films. If the film contains particles at a concentration of more than 0.1% by weight, then the haze of the film is no longer in the range according to the invention.

Customary antiblocking agents are inorganic and/or organic particles, such as, for example, calcium carbonate, amorphous silica, talc, magnesium carbonate, barium carbonate, calcium sulfate, barium sulfate, lithium phosphate, calcium phosphate, magnesium phosphate, aluminium oxide, calcium, barium, zinc or manganese salts of the derived dicarboxylic acids used in the film, titanium dioxide, kaolin, or crosslinked polystyrene particles or crosslinked polymer particles based on acrylic acid derivatives.

Particles preferred in accordance with the invention are synthetically manufactured, amorphous $SiO_2$ particles in colloidal form. The particles are incorporated outstandingly into the polymer matrix and generate only few vacuoles.

In the applications for thermoformed films, such as in-mould decoration/in-mould labelling, furniture production, blisters or metal lamination (can liners), for example, the film is subjected to a high temperature load for a comparatively short time. The temperature load is confined essentially to the shaping operation, which is in the range of seconds, during which mould temperatures of up to 220° C. are entirely possible. For this case, the stability of the film formulated in accordance with the invention is sufficient—no further additives are needed.

The situation is different, for example, in the context of food packaging, where—depending on application—a significantly improved thermal behaviour of the film is required (in the case, for example, of the cook-in method (in this regard, see EP 1 697 129 or EP 2810776 A1)).

As part of the process, the thermoformable film over a large part of its area is not subject to a high thermal load. Only in the rim region of the pack, and here, in particular, at the corners of the pack (sealed edge) is there a markedly increased thermal load on the film. While the rest of the thermoformed film experiences temperatures of well below 160° C., through the evaporating water, the corner region of the pack is exposed to the oven temperature for the entire cooking time.

Here, in extreme cases, the film in the corner region is thermally exposed at a temperature of 220° C. for more than 2 hours, and, at this elevated temperature, it is possible for oxygen to penetrate the polymer.

As a consequence of this, it may well be the case that the pack and hence the film, particularly in the corners, begins to become brittle and displays a tendency towards fragmentation. This is extremely undesirable and must be prevented.

If an increased thermal stability is required for this area of application, the film—made from preferably antimony-free polyester—preferably comprises one or more radical scavengers. This radical scavenger or scavengers is or are based preferably on phenolic antioxidants.

In has surprisingly been found that the film which comprises one or more radical scavengers exhibits a significantly increased temperature resistance, and so packaging produced from it is able to remain in an oven at temperatures of above 220° C. for more than an hour without suffering embrittlement.

In one preferred embodiment the film according to the present invention comprises 500-3000 ppm of a radical scavenger, the amount being preferably between 600-2500 ppm and with more particular preference to between 700-2000 ppm. Amounts lower than 500 ppm tend to lead to failure in the oven (i.e. fragmentation), and amounts higher than 3000 ppm have no further enhancing effect on the film and therefore only reduce the economic efficiency and may lead to migration of the stabilizer from the film to a packaged foodstuff. Amounts above 3000 ppm, moreover, tend to lead to the formation of gels and to an unwanted yellow tinge to the film.

Radical scavengers used may be either one compound or a mixture of different radical scavengers, it being preferred for one compound to be used as radical scavenger. The radical scavenger or scavengers used are selected preferably from the group of the phenolic antioxidants.

Preferred radical scavengers are pentaerythritol tetrakis [3-(3,5-di-tert-butyl-4-hydroxyphenyl)propionate] (CAS No. 6683-19-8) and 1,3,5-trimethyl-2,4,6-tris(3,5-di-tert-butyl-4-hydroxybenzyl)benzene) (CAS No. 1709-70-2), available under the tradenames IRGANOX 1010 and IRGANOX 1330 from BASF.

The efficiency of the radical scavenger may be tested directly on the packaging, after removal of the packaging from the oven, for example. The packaging in this context is rated good (i.e. suitable for the application) if fragmentation is not found at any point on the film according to the present invention.

The film may be of single-layer or multilayer (i.e. at least two-layer) construction. To achieve the aforesaid properties, particularly the requisite good optical properties of the polyester film, a single-layer construction of the film has emerged as being advantageous. However, a two- or three-layer construction of the film, from two layers A' and A" or three layers A'A"A' or A'A"A''', has also proven to be suitable. The amount of particles in the base layer A" of a—for example—three-layer film ought to be lower than in the two layers A' (and A'''), which are preferably the same in construction or else may also be different.

The particle concentration in the layer (A") ought to be selected so that it positively affects the haze and the gloss of the film. In the case of a three-layer film of the stated type, the particle concentration in layer (A") would be between 0 and 0.08% by weight, preferably between 0 and 0.05% by weight and more particularly between 0 and 0.02% by weight.

When selecting the particle concentration in the outer layers (A' and/or A''') and in the base layer (A"), it should be ensured that the particle concentration in the film as a whole does not exceed the inventive value of 0.1% by weight.

The thickness of the two layers A' (or A' and A''') may be the same or different. Their thicknesses are in general between 0.2 and 5 µm. The film, furthermore, may additionally comprise customary additives, such as stabilizers (UV or hydrolysis) in the concentrations recommended by the manufacturer. They are added usefully to the polymer, or to the polymer mixture, even before the melting process in the extruder.

The overall thickness of the polyester film of the invention may vary within certain limits. It is 50 to 300 µm, preferably 55 to 300 µm and more preferably 60 to 300 µm. If the thickness of the film is less than 50 µm, then the mechanical and barrier properties of the thermoformed film are inadequate. If, on the other hand, the thickness of the film is greater than 300 µm, the thermoformability of the film is impaired and also the production of the film becomes uneconomic, with both effects being unwanted.

Likewise a subject of the present invention is a process for producing the thermoformable film. The process comprises producing the film by extrusion or coextrusion (e.g. production of the layers (A'A"A''')), biaxially stretching the film, and also heat-setting and winding the stretched film.

In the case of the coextrusion process, after the extrusion of the respective melts in separate extruders, they are shaped and layered one over another in a multilayer die to form flat films of melt. The multilayer film is then taken off and solidified with the aid of a chill roll and, where appropriate, further rolls. For the mixing of the different components, it has proven to be advantageous here if the extrusion of the polymers for the film or film with the layers (A'A"A''') is carried out with a twin-screw extruder having one or more venting facilities. This produces a film which is visually flawless—having, for example, no clouding or no streaks.

The biaxial stretching of the film is carried out sequentially. In the case of sequential stretching, stretching takes place preferably first in the longitudinal direction and subsequently in the transverse direction. Stretching in the longitudinal direction can be carried out, for example, by means of two rolls which rotate at different speeds according to the desired stretching ratio. For the transverse stretching, use is generally made of a corresponding tenter frame.

The temperatures at which the biaxial stretching is carried out may vary within certain ranges, and are guided essentially by the desired properties, especially the desired thermoforming properties, of the film of the invention. Surprisingly it has been found here that the desired thermoformability can be achieved by stretching the film to a lesser extent than is usual in accordance with the prior art.

To obtain the desired thermoformability of the film, the stretching in longitudinal direction is carried out under certain conditions. The temperature of the film during the stretching is in a range from 70 to 100° C. (the heating temperatures of the rolls are 60 to 110° C.). The longitudinal stretching ratio selected is in the range from 2.2:1 to 3.8:1, preferably in the range from 2.3:1 to 3.6:1 and more preferably in the range from 2.4:1 to 3.4:1. If the film is to stretched below 2.2:1, then, for example, the thickness profile is poor; if the film is stretched above 3.8:1, the thermoformability is no longer sufficient.

After the longitudinal stretching, the transverse stretching takes place in a corresponding tenter frame. The temperatures of the heating fields in the tenter frame are 70 to 120° C. (film temperature: 60 to 110° C.). Stretching in the transverse direction is carried out in a film temperature range from 90° C. (start of stretching) to 140° C. (end of stretching). The transverse stretching ratio in accordance with the invention is in the range from 2.2:1 to 3.8:1, preferably from 2.4:1 to 3.7:1 and more preferably in the range from 2.6:1 to 3.6:1. If the film is stretched below 2.2:1, then the thickness profile is poor, for example; if the film is stretched above 3.8:1, the thermoformability is no longer sufficient.

After the biaxial orientation, the film is heat-set. Surprisingly it has been found that in order to achieve the aforementioned, desired, good thermoformability of the film, it is necessary for the heat-setting to be carried out under certain conditions in accordance with the invention. The duration for the heat-setting in accordance with the invention is 5 to 25 s, preferably 6 to 22 s and more preferably 7 to 20 s. The temperature at which heat-setting is carried out in accordance with the invention is in the range from 175 to 220° C., preferably in the range from 178 to 215° C. and more preferably in the range from 180 to 210° C.

After the heat-setting, the film is cooled and wound up in a usual way.

To produce the film of the invention it is important that the process conditions stated above are observed. If the stated process conditions of the invention are not observed during the longitudinal and transverse stretching, and also during the setting of the film, then the film properties according to the invention in terms of film mechanics, but also in terms of the desired thermoformability and puncture resistance, may not be realized, which is to unwanted.

In one preferred embodiment, for improving the windability of the transparent film with a low degree of filling, at least one surface of the film is coated in-line or off-line with a further layer (C) which comprises poly(alkyl acrylate), and/or poly(alkyl methacrylate) and/or poly(alkyl acrylate-co-methacrylate) esters. Moreover, they may be acrylic and/or methacrylic copolyesters present that bring about crosslinking of the polymers. In this case it is preferred to use N-methylolacrylamide to prepare the copolymers, this acrylamide representing the crosslinking unit. Furthermore, it is also possible for other crosslinkers to be used, such as melamine, for example. The coating is preferably applied in-line.

The coating (C) according to the present invention is described comprehensively in EPA 0 144 948, whose United States equivalent is U.S. Pat. No. 4,571,363, which is hereby incorporated by reference herein.

The preferred acrylate coating is applied to at least one side of the film, and serves essentially to improve the winding, more particularly to improve the unwinding of the film after storage (at elevated temperatures). The coating formula may include known additions such as, for example, antistats, wetting agents, surfactants, pH regulators, antioxidants, dyes, pigments, anti-blocking agents such as, for example, colloidal $SiO_2$, etc. It is normally appropriate further to incorporate a surfactant in order to increase further the capacity of the aqueous coating to wet the polyester carrier film and to stabilize the particles comprised of copolymers of acrylic/methacrylic acid.

The coating of the film with the acrylically crosslinking layer (C) takes place either in-line, preferably between the first and second stretching steps, or off-line, after the biaxially oriented film has been produced.

The polyester film is coated with the functional coating in such a way that the coating on the finished polyester film has a thickness of preferably 5 to 100 nm, more preferably 10 to 90 and very preferably 15 to 80 nm. Particularly preferred is the application of the layer (C) by means of the reverse gravure-roll coating method, in which case the coating can be applied extremely homogeneously in layer thicknesses of up to 200 nm. The coating is applied preferably as a solution, suspension or dispersion, more preferably as an aqueous solution, suspension or dispersion.

The stated substances are applied in the form of a dilute aqueous solution or dispersion to one of the two film surfaces, and the solvent is then volatilized. If the coating is applied in-line before the transverse stretching, the temperature treatment in the transverse stretching and the subsequent heat-setting is enough to volatilize the heat solvent and to dry the coating.

The film of the invention, produced by the process of the invention as described above, possesses a series of properties, of which the most important are listed below.

The film of the invention is notable for very good mechanical properties (e.g. surface elasticity modulus, sum total of the strengths), which make it possible, among other things, for the desired good thermoformability and the desired good puncture resistance to be achieved.

The film of the invention is notable for brilliant optical properties. The haze of the film is less than 2.0%, preferably less than 1.5% and more preferably less than 1.0%. The clarity is greater than 85%, preferably greater than 90% and more preferably greater than 95%. The gloss is more than 120, preferably more than 150 and more preferably more than 180.

The puncture resistance F[N] of the film, which is important for the application, is surprisingly at a level such that the thermoformed pack produced from it can be transported and stored without damage. In the range of definition for the thickness, the film has a puncture resistance F which correlates with the thickness d of the film in accordance with the following formula $$\frac{F[N]}{d(\mu m)} > 0.35$$

Preferably F/d is greater than 0.37 and more preferably F/d is greater than 0.38.

The film has a thermoformability which amounts to at least 70 mm, and a thermoforming ratio of at least 2.5. The thermoformability is preferably greater than 73 mm and more preferably greater than 76 mm. The thermoforming ratio is preferably greater than 2.6 and more preferably greater than 2.7.

The film exhibits the required good barrier properties, particularly with respect to oxygen and water vapour.

The high-transparency film has good winding and processing properties. When the films are wound, the individual film plies do not adhere to one another, not even at elevated temperature, such as 50 or 60° C.

The thermoformable polyester film of the invention is outstandingly suitable for the packaging of foods and other consumable items. It is suitable more particularly for the packaging of foods and other consumable items in deep thermoformed food trays which have been produced by the processes according to the prior art.

The properties summarized in Table 1 include the most important properties of the film of the invention.

TABLE 1

Inventive ranges

| | | Inventive range | Preferred | More preferred | Unit | Test method |
|---|---|---|---|---|---|---|
| Film | | | | | | |
| Fraction of copolyester in film | | ≥85 | ≥86 | ≥87 | % by wt. | |
| Fraction of units in the copolyester comprised of isophthalate units | | 6 to 15 | 7 to 14 | 8 to 13 | mol % | |
| Filler concentrations | | 0 to 0.1 | $1.1 \times 10^5$ to 0.075 | $1.1 \times 10^5$ to 0.05 | % by wt. | |
| Particle diameter $d_{50}$ | | 1.5 to 5 | 1.7 to 4.5 | 2.0 to 4.0 | μm | |
| Processing | | | | | | |
| Longitudinal stretching (T process) | Heating temperature of rolls | 60 to 110 | 65 to 105 | | ° C. | |
| | Stretching temperature of film | 70 to 100 | 75 to 100 | | ° C. | |
| | Longitudinal stretching ratio | 2.2 to 3.8 | 2.3 to 3.6 | 2.4 to 3.4 | ° C. | |
| Transverse stretching | Temperature of heating fields | 70 to 120 | | | ° C. | |
| | Heating temperature of the film | 60 to 110 | | | ° C. | |
| | Stretching temperature | 90 to 140 | | | ° C. | |
| | Transverse stretching ratio | 2.2 to 3.8 | 2.4 to 3.7 | 2.6 to 3.6 | | |
| Setting | Temperature | 175 to 220 | 178 to 215 | 180 to 210 | ° C. | |
| | Duration | 5 to 25 | 6 to 22 | 7 to 20 | Sec | |

TABLE 1-continued

| | Inventive ranges | | | | |
|---|---|---|---|---|---|
| | Inventive range | Preferred | More preferred | Unit | Test method |
| Film properties | | | | | |
| Surface elasticity modulus | 4500 to 6300 | 4600 to 6200 | 4700 to 6100 | N/mm² | ISO 527-1 and ISO 527-3; specimen type 2 |
| Sum total of σ5 values | 170 to 220 | 175 to 215 | 180 to 210 | N/mm² | ISO 527-1 and ISO 527-3; specimen type 2 |
| Density | <1390 | <1389 | <1387 | kg/m³ | ASTM D1505-68 Method C |
| Film haze | <2.0 | <1.5 | <1.0 | % | ASTM D 1003-61, method A |
| Film clarity | ≥85 | ≥90 | ≥95 | % | ASTM D 1003 |
| Film gloss | >120 | >150 | >180 | N/15 mm | DIN 67530 |
| pFilm SV | 680 to 1000 | 710 to 950 | 740 to 900 | | |
| Puncture resistance/film thickness | >0.35 | >0.37 | >0.38 | N/μm | EN 14447 |
| Thermoformability  Depth | ≥70 | ≥73 | ≥76 | mm | |
| $A_{Tray}/A_{film}$ | ≥2.5 | ≥2.6 | ≥2.7 | | |
| Film thickness | 50 to 300 | 51 to 300 | 52 to 300 | μm | |

Measurement Methods

To characterize the raw materials and the films, the following measurement methods were used:

Elasticity Modulus

The elasticity modulus is determined in accordance with DIN EN ISO 572-1 and -3 (type-2 specimen) on film strips measuring 100 mm×15 mm. The surface elasticity modulus is calculated according to the following formula:

$$E_{surface} = \sqrt{(E_{MD}^2 + E_{TD}^2)}$$

σ5

The σ5 is determined in accordance with DIN EN ISO 527-1 and -3 (type-2 specimen) on film strips measuring 100 mm×15 mm.

Density

The density of the film is determined as per ASTM-D 1505-68, method C.

Haze and Clarity

The measurement on the polyester films is made using the HAZEGARD® XL-211 hazemeter from BYK-Gardner GmbH Deutschland. The haze was determined as per ASTM-D 1003-61, method A. The clarity is measured according to ASTM-D 1003 by means of HAZEGARD®, but now at the "clarity port" of the instrument. The measurements are all carried out directly after production on the film.

20° Gloss

The gloss is determined as per DIN 67530. The value measured is the reflector value as the optical parameter for the surface of a film. Drawing on the ASTM-D 523-78 and ISO 2813 standards, an incident beam angle is set at 20°. A light beam strikes the planar test surface at the incident angle set, and is reflected and/or scattered by that surface. The light beams striking the photoelectronic receiver are displayed as a proportional electrical variable. The measurement value is dimensionless and must be reported with the incident beam angle.

Standard Viscosity SV

The standard viscosity in dilute solution, SV, was measured, drawing on DIN 53 728 Part 3, in an Ubbelohde viscosimeter at (25±0.05) ° C. Dichloroacetic acid (DCA) was used as solvent. The concentration of the dissolved polymer was 1 g polymer/100 mL pure solvent. The polymer was dissolved for 1 hour at 60° C. If the samples after this time were not fully dissolved, up to two further dissolution tests were conducted at 80° C. for 40 minutes in each case, and the solutions were subsequently centrifuged for an hour at a speed of 4100 min⁻¹.

The dimensionless SV is determined from the relative viscosity ($\eta_{rel} = \eta/\eta_s$) as follows:

$$SV = (\eta_{rel} - 1) \times 1000$$

The fraction of particles in the film or polymer raw material was determined by ashing and corrected by increasing input weight accordingly. In other words:

$$\text{Input weight} = \frac{\text{(input weight corresponding to 100\% polymer)}}{[(100 - \text{particle content in \% by weight}) \cdot 0.01]}$$

Mean Particle Diameter $D_{50}$

The average polymer size $d_{50}$ was determined by means of a Malvern MASTER SIZER® 2000. For this determination, the particles for use were dispersed in water and transferred to a cell which was analysed in the instrument, the size being determined by means of laser diffraction. Generally speaking, the detector records an intensity picture of the diffracted laser light, and a mathematical correlation function is used to determine the particle size distribution from the angle-dependent light intensity of the diffracted laser light. The particle size distribution is characterized by two parameters: the median $d_{50}$ (=measure of position of the central value), and the degree of scattering SPAN98 (=measure of scattering of the particle diameter). The measurement procedure took place automatically and included the mathematical determination of the $d_{50}$.

Measurements on the film produced with these particles yield a $d_{50}$ which is lower by 15-25% than for the particles employed.

Puncture Resistance (≈Puncture Test)

The puncture resistance (≈puncture test) is measured according to EN 14477. In the packaging sector, exposure to hard, pointed or angular items is an important variable. It is advantageous to know the puncture resistance if the films are used as packaging material for foods or for sharp-edged parts, for example. The EN 14477 puncture test measures this behaviour with respect to a tip 0.8 mm in diameter. This test is also known as the Parker Pen Test/Parker Ballpoint Test.

Determination of Thermoforming Properties

For determining the thermoforming properties of the film, the film was thermoformed on a Multivac machine (e.g. R245/SN:166619) under the moulding conditions (mould temperatures 210° C., heating time: 2-3 s, explosive forming/compressed-air reservoir 2 bar, moulding pressure 2 bar tested, moulding: 2 s). The formats set for the trays under production are evident from FIG. 1. The two properties which characterize the thermoformability of the film of the invention are The maximum thermoforming depth in mm of the film of the invention (=depth of the tray) and The thermoforming depth ratio $A_{tray}/A_{film}$ ($A_{tray}$=surface area of thermoformed tray, $A_{film}$=surface area of film of the invention used)

Determination of Barrier Properties

The Water Vapour Transmission Rate (WVTR) was measured on films of various thicknesses at 23° C. and 85% r.h. in accordance with ISO 15106-3. The oxygen barrier (OTR) was measured using an OXTRAN® 100 from Mocon Modem Controls (USA) in accordance with ISO 15105-2, Annex A, 23.0° C./50% r.h. The OTR was again measured on films of various thicknesses.

The invention is elucidated in more detail below, using examples.

Inventive Example 1

The process of the invention was used to produce a biaxially oriented film from an ethylene terephthalate-ethylene isophthalate copolymer. The thickness of the film was 96 μm. For producing the film, the extruder was supplied with chips of the copolymer. In accordance with the process conditions set out in the table below, the copolymer was melted and homogenized in the extruder.

Following filtration, the melt was shaped in a slot die and expelled via the die lip. The molten film was cooled, and a transparent, single-layer film was produced via graduated orientation in the longitudinal and transverse directions with subsequent setting.

To obtain good winding of the film, the film was coated from an aqueous dispersion by means of a reverse gravure process between the longitudinal and transverse stretching. The coating (C), crosslinked acrylically in the tenter frame, comprises a 4.5% by weight dispersion of a latex, consisting of a copolymer comprised of 60% by weight of methyl methacrylate, 35% by weight of ethyl acrylate and 5% by weight of N-methylolacrylamide, and of a surfactant. The dry weight of the coating (based on the biaxially oriented film) was around 0.035 g/m².

The composition of the copolymer for the film of the invention is as follows 89 mol % ethylene terephthalate units 11 mol % ethylene isophthalate units The production conditions in the individual process steps were as follows:

| Extrusion | Temperatures for the melt | 270 | ° C. |
|---|---|---|---|
| | Temperature of the take-off roll | 20 | ° C. |
| Longitudinal stretching | Heating temperature of the rolls | 70-90 | ° C. |
| | Stretching temperature | 86 | ° C. |
| | Longitudinal stretching ratio | 3.0 | |

-continued

| Transverse stretching | Temperature of the heating fields | 118 | ° C. |
|---|---|---|---|
| | Stretching temperature | 135 | ° C. |
| | Transverse stretching ratio | 3.4 | |
| Setting | Temperature | 185 | ° C. |
| | Duration | 9 | s |

Table 3 shows the composition of the film, and also further information on the film of the invention, particularly regarding the properties of the film of the invention.

Inventive Example 2

Relative to Inventive Example 1, only the production process for the film was modified. The convergence in the setting was now 1.75%; in Inventive Example 1 it was 0%. The overall result was similar, with a slight increase in the puncture resistance of the film.

Inventive Example 3

Relative to Inventive Example 1, only the composition of the raw material mixture fed to the extruder was altered. The raw material mixture now additionally contains 1500 ppm of a radical scavenger (IRGANOX® 1010), which was metered in the form of a masterbatch based on polyethylene terephthalate. The new raw material mixture is evident from the table below. The raw material mixture currently contains an additional 10.18 mol % of ethylene isophthalate units.

| Film | | Unit |
|---|---|---|
| Fraction of copolyester with IPA fraction of 11 mol % in the raw material mixture | 92.5 | % by weight |
| Fraction of PET masterbatch of 2% radical scavenger (Irganox 1010) in the raw material mixture | 7.5 | % by weight |
| Fraction in raw material mixture made up of isophthalate units | 10.18 | mol % |
| Fraction of radical scavenger in the raw material mixture | 1500 | ppm |

Table 3 again shows the properties of the film of the invention.

The film according to Inventive Example 3 of this application was clamped as a thermoformable bottom film, and HOSTAPHAN® RPSM 40 AFI was clamped as a sealable and peelable polyester top film, individually, into a Multivac machine (R 245/SN:166619). The bottom film was thermoformed under the moulding conditions (mold temperatures 210° C., heating time: 2-3 s, explosive to shaping/compressed-air reservoir 2 bar, molding pressure 2 bar tested, molding: 2 s). The formats set for the trays to be produced are apparent from FIG. 1, including Mould 1. The thermoforming depth of the bottom film was 70 mm, the thermoforming depth ratio 2.6.

A portion of pork was placed into the cavity and the top film was brought onto the top face of the bottom film in such a way that the heat-sealable surface of the top film was in contact with the bottom film. Heat sealing was carried out on the same machine at a temperature of 160° C. for 2 s under a pressure of 2 bar.

The weight of the portion of meat was approximately 1000 g. The pack was placed into a conventional domestic oven and cooked at 220° C. for 70 minutes.

After the end of the cooking cycle, the top film was peeled off by hand from the bottom film of the pack, and the film according to the present invention was investigated for brittleness. No brittleness (no fragmentation) of the film, not even at the corners, was found.

Comparative Example 1

In comparison to Inventive Example 1, the proportion of isophthalate in the film was lowered to 5.0 mol %; everything else was left the same. Table 3 shows the properties to of the film.

Comparative Example 2

Example 1 from EP 1 697 129 B1 was reproduced. Table 3 shows the properties of the film. The laminate is suitable for the applications specified at the outset, but is in need of improvement in terms of thermoformability, puncture resistance and particularly in optical qualities (haze).

Comparative Example 3

Example 1 from EP 1 945 512 B1 was reproduced. The process is suitable for the applications specified at the outset; the films described in more detail in EP 1 945 512 B1, however, are in need of improvement in terms of thermoformability, puncture resistance and particularly in optical qualities (haze).

Comparative Example 4

Example 3 from EP 2810776 A1 was reproduced. Table 3 shows the properties of the film. The film is suitable for the applications stated at the outset, as for example for producing thermoformable film pouches with a low thermoforming ratio. The film is also suitable for the cook-in method; because of the process conditions selected in the stretching assemblies, however, the film is in need of improvement in terms of thermoformability and puncture resistance. Above all, however, the film from Example 3 of EP 2810776 A1 is in need of improvement in terms of optical qualities (haze).

TABLE 3

Film compositions and film properties

| | | Composition of raw material mixture for film | | | IRGANOX® 1010 ppm | Elasticity module of film | | Surface elasticity modulus N/mm² | σ5 of film | | Sum total of σ5 values | Density kg/dm³ | Haze of film % | Clarity of the film % | Gloss of the film A side |
|---|---|---|---|---|---|---|---|---|---|---|---|---|---|---|---|
| | | TA mol % | IA | EG | | Md | Td | | Md | Td | | | | | |
| Inventive Examples | 1 | 89 | 11 | 100 | | 3682 | 4117 | 5523 | 94 | 100 | 194 | 1.385 | 0.4 | 100 | 205 |
| | 2 | 89 | 11 | 100 | | 3843 | 4294 | 5763 | 94 | 103 | 197 | 1.385 | 0.4 | 100 | 204 |
| | 3 | 89.825 | 10.175 | 100 | 1500 | 3874 | 4479 | 5922 | 98 | 99 | 197 | 1.386 | 0.3 | 100 | 202 |
| Comp. Examples | 1 | 95 | 5 | 100 | | 4210 | 4769 | 6361 | 103 | 100 | 203 | 1.392 | 0.4 | 100 | 215 |
| | 2 | 76.2 μm PA + 25.4 μm APET | | | | | | | | | | | 17 | 75 | 74 |
| | 3 | 50 μm Polyester | | | | 4175 | 4175 | 5904 | | | | | 5 | | 120 |
| | 4 | 91 | 9 | 100 | 1000 | | | | | | | | 5.3 | | |

| | | Gloss of the film B side | SV of the film | Puncture resistance N/μm | Thermoformability | | Barrier properties of the film | | Winding behaviour | Cooking of pork at 220° C. for 70 min |
|---|---|---|---|---|---|---|---|---|---|---|
| | | | | | Depth Ashell mm | Ashell/Afilm | OTR cm²/(m² × bar × d) | WVTR g/(m² × d) | | |
| Inventive Examples | 1 | 205 | 777 | 0.395 | 70 | 2.86 | 16 | 1.89 | very good | pack not brittle |
| | 2 | 203 | 777 | 0.398 | 70 | 2.86 | 16 | 1.89 | very good | |
| | 3 | 202 | 801 | 0.391 | 70 | 2.86 | 16 | 1.88 | very good | |
| Comp. Examples | 1 | 214 | 787 | 0.36 | 55 | 2.00 | | | very good | pack not brittle |
| | 2 | 76 | | | 65 | 2.00 | | | | |
| | 3 | 120 | | | 50 | 2.00 | | | | |
| | 4 | | 783 | | 55 | 2.00 | | | | |

That which is claimed:

1. A transparent, biaxially oriented, thermoformable polyester film comprising at least 85% by weight of a copolyester whose dicarboxylic acid components comprise from 85 to 94 mol % terephthalic acid-based units and from 6 to 15 mol % isophthalic acid-based units, wherein the film further comprises
   a) a surface elasticity modulus in the range from 4500 to 6400 N/mm$^2$,
   b) a sum total of the strengths ($\sigma_5$) in longitudinal direction and in transverse direction in the range from 170 to 220 MPa,
   c) a density of less than 1390 kg/m$^3$,
   d) a haze of less than 2.0%, a clarity of at least 85% and a gloss of at least 120, and
   e) a thickness in the range from 50 to 300 μm.

2. A transparent polyester film comprising at least 85% by weight of a copolyester whose dicarboxylic acid components comprise from 85 to 94 mol % terephthalic acid-based units and from 6 to 15 mol % isophthalic acid-based units, wherein the film further comprises
   a) a surface elasticity modulus in the range from 4500 to 6400 N/mm$^2$,
   b) a sum total of the strengths ($\sigma_5$) in longitudinal direction and in transverse direction in the range from 170 to 220 MPa,
   c) a density of less than 1390 kg/m$^3$,
   d) a haze of less than 2.0%, a clarity of at least 85% and a gloss of at least 120, and
   e) a thickness in the range from 50 to 300 μm,
   wherein the polyester film comprises one or more radical scavengers.

3. The transparent polyester film according to claim 2, wherein the radical scavenger(s) is a phenolic antioxidant(s).

4. The transparent polyester film according to claim 3, wherein the phenolic antioxidant is selected from the group consisting of pentaerythritol tetrakis[3-(3,5-di-tert-butyl-4-hydroxyphenyl)propionate] and 1,3,5-trimethyl-2,4,6-tris(3,5-di-tert-butyl-4-hydroxybenzyl)benzene.

5. The transparent polyester film according to claim 1, wherein the polyester film is antimony-free.

6. The transparent polyester film according to claim 1, wherein the surface elasticity modulus in the range from 4500 to 6300 N/mm$^2$.

7. The transparent polyester film according to claim 6, wherein the polyester film comprises one or more radical scavengers.

8. The transparent polyester film according to claim 7, wherein the radical scavenger(s) is a phenolic antioxidant(s).

9. The transparent polyester film according to claim 8, wherein the phenolic antioxidants are selected from the group consisting of pentaerythritol tetrakis[3-(3,5-di-tert-butyl-4-hydroxyphenyl)propionate] and 1,3,5-trimethyl-2,4,6-tris(3,5-di-tert-butyl-4-hydroxybenzyl)benzene.

10. The transparent polyester film according to claim 6, wherein the polyester film is antimony-free.

11. A process for producing the film according to claim 1 comprising
    (a) extruding the polymer melts of the layer(s),
    (b) biaxially stretching the extruded melts of the film
        (i) in longitudinal direction at a temperature between 70° and 100° C. with a longitudinal stretching ratio of 2.2:1 to 3.8:1, and
        (ii) in transverse direction at a temperature between 90° and 140° C. with a transverse stretching ratio of 2.2:1 to 3.8:1,
    (c) heat setting the stretched film for 5 to 25 s at 175° to 220° C. and
    (d) winding the heat-set stretched film.

12. An in-mold decoration film for food packaging, hardshell cases, furniture lamination or metal lamination comprising the transparent polyester film as claimed in claim 1.

13. The in-mold decoration film as claimed in claim 12, wherein the food packaging is blister packaging and the metal lamination a can liner.

14. The transparent polyester film according to claim 1, wherein the film further comprises particles, said particles present at a concentration of 0 to 0.1% by weight.

15. The transparent polyester film according to claim 1, wherein said film further comprises a coating consisting of an acrylate coating.

* * * * *